Oct. 8, 1957  P. G. STEWART  2,808,814
ENGINE

Filed June 20, 1956  3 Sheets-Sheet 1

INVENTOR
Phillip G. Stewart

BY Dodge and Sons

ATTORNEYS

INVENTOR
Phillip G. Stewart

Oct. 8, 1957 P. G. STEWART 2,808,814
ENGINE
Filed June 20, 1956 3 Sheets-Sheet 3
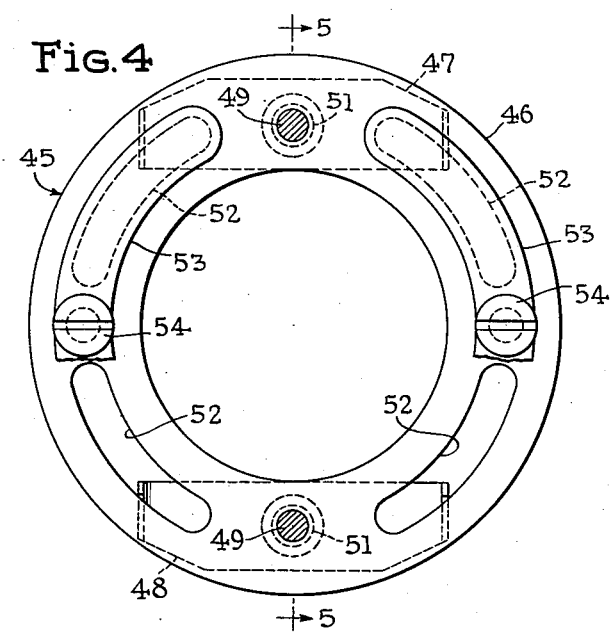
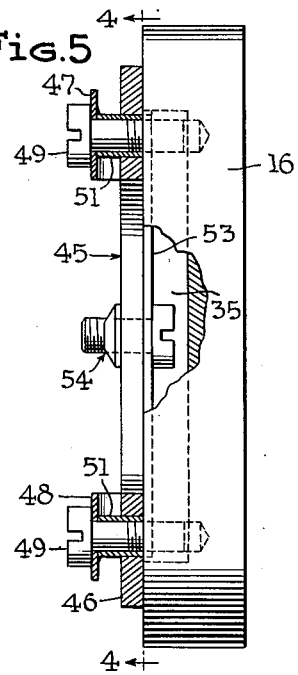
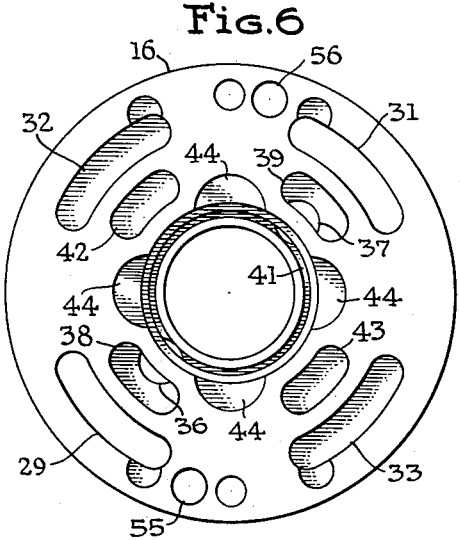
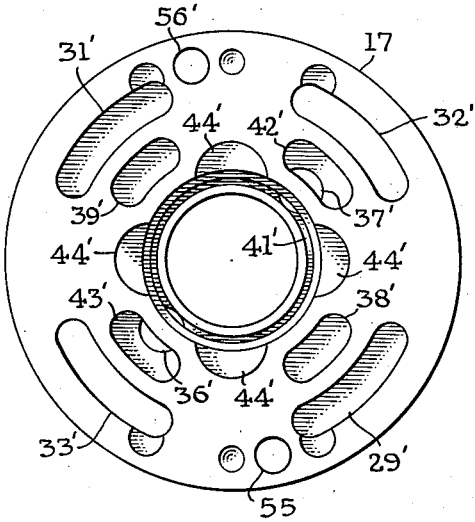
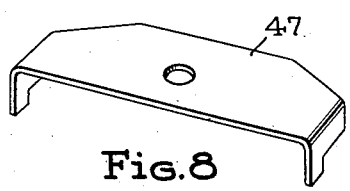
INVENTOR
Phillip G. Stewart
BY Dodge and Sons
ATTORNEYS

United States Patent Office 2,808,814
Patented Oct. 8, 1957

2,808,814

ENGINE

Phillip G. Stewart, Milwaukee, Wis., assignor to The New York Air Brake Company, a corporation of New Jersey Application June 20, 1956, Serial No. 592,685

5 Claims. (Cl. 121—92)

This invention relates to rotary engines of the vane type having fluid pressure biased vanes and more particularly to an improvement in such devices which enables them to operate efficiently as either a motor or a pump. The term engine is used herein in its generic sense to denote convertible devices which may operate either as pumps or motors.

In prior engines of this type, such as the one shown in Rosaen Patent 2,636,481, issued April 28, 1953, asymmetric flow valves are employed to provide a pressure differential between the fluid in the working chambers and the fluid acting beneath the vanes. This pressure difference is necessary because when the engine is started as a motor, centrifugal forces are low and working chamber pressures are high, and if the pressure beneath the vanes was equal to or less than the working chamber pressure a satisfactory seal between the vane and the cam ring could not be realized. In order to obtain satisfactory sealing, it is essential that the pressure in the working chambers be made less than that acting beneath the vanes so that the resultant radial force along the vanes is in an outward direction.

The availability of prior art engines incorporating these asymmetric flow valves is limited since they cannot be used as pumps or as motors in applications where an over-running load condition would arise unless costly and complicated auxiliary supercharging apparatus is also included. The reason for this is that when the engine is pumping, the flow of fluid entering the engine is throttled because the asymmetric valves are biased closed. Operation under these conditions would produce severe cavitation. It is therefore essential that the inlet be pressurized by some auxiliary means. If the engine is to be operated solely as a pump, then the asymmetric flow valves could be removed, because the pressure in the working chambers at starting condition would not be sufficient to force the vanes away from the cam ring. But such modification reduces the versatility of the engine and would not solve the problems encountered during the overrunning load condition, since it is impossible to remove these valves while the engine is operating.

The object of this invention, therefore, is to permit the interchangeable use of such engines as either pumps or motors without the need for auxiliary supercharging apparatus. The present invention involves the incorporation into these engines of a differential pressure actuator which is responsive to the pressures in both the inlet and exhaust manifolds of the engine and which, when the engine is pumping and outlet pressure exceeds inlet pressure, operates so as to open the asymmetric valve on the inlet side and thereby avoid the cavitation which would otherwise occur. At the same time, the actuator allows the asymmetric valve on the exhaust side of the engine to close and thereby provide a certain amount of restriction to exhaust flow which tends to damp the overrunning condition of the engine.

When the engine is operating as a motor, and inlet pressure exceeds exhaust pressure, the actuator will operate to open the asymmetric valve on the exhaust side of the engine and relieve the back pressure otherwise created by such valve. In this case the asymmetric valve on the inlet side will be allowed to close.

Another object of this invention is to provide an improved type of asymmetric flow valve for such engines which is arranged to cooperate with the differential actuator to produce the above-mentioned solution to the cavitation problem.

The preferred embodiment of the invention will now be described by reference to the accompanying drawings in which:

Fig. 4 is a section taken on line 4—4 of Fig. 5 showing the inner face of the asymmetric flow valve with the flapper valves partially broken away.

Fig. 5 is a section taken on line 5—5 of Fig. 4 showing the asymmetric flow valve, in section, mounted on the cheek plate, which is shown in elevation. Part of the cheek plate is broken away to show a detail of construction.

Fig. 6 is a view, in reduced size, of the inner face of the left-hand cheek plate in Fig. 1.

Fig. 7 is a view, in reduced size, of the inner face of the right-hand cheek plate in Fig. 1.

Fig. 8 is a perspective view of one of the disc valve mounting springs.

Figure 1:
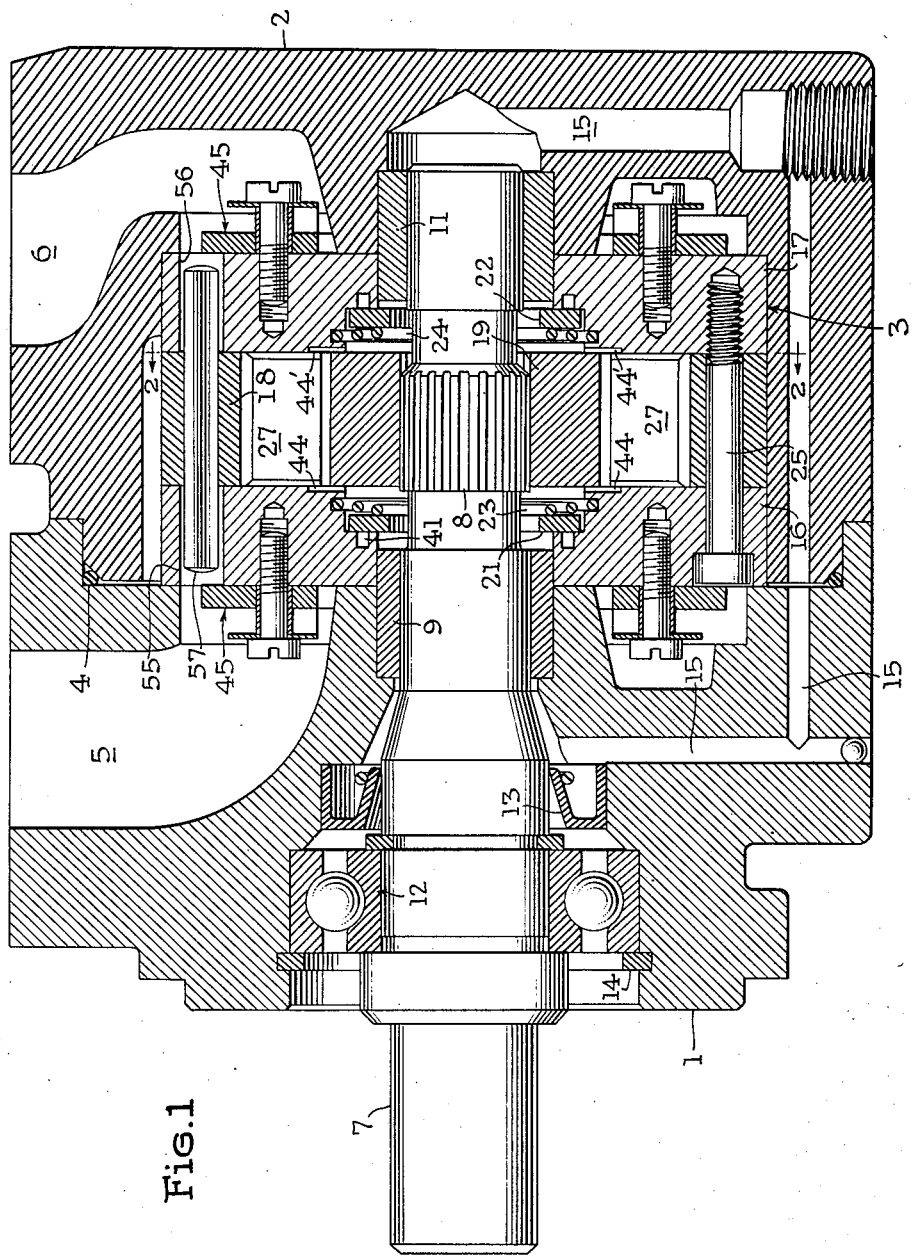
Fig. 1 is a longitudinal section of the complete engine taken substantially along line 1—1 of Fig. 2.

Referring to Fig. 1, the engine housing comprises two sections 1 and 2 which have been bored to receive and hold cartridge unit 3 and which are joined by suitable attaching means (not shown). The inner face of section 2 is beveled to receive annular sealing gasket 4 which when compressed between the two sections in the assembled condition, produces a fluid tight joint. Each section is cored at 5 and 6 respectively to provide manifolds which surround the shaft 7 and which, for convenience of description, will be considered the inlet and exhaust manifolds respectively. Suitable attaching means (not shown) are provided to connect the manifolds to the external hydraulic circuitry. A shaft 7, which is splined at 8 to engage the rotor, hereinafter described, is rotatably mounted within the housing in bushings 9 and 11 and ball bearing 12 and is provided with conventional sealing means 13. The bearing 12 is secured in position by retainer ring 14 which is received in a groove provided in housing section 1. Drain passages 15 are formed in each section of the housing to collect any fluid which may leak along shaft 7 past bushings 9 and 11.

The cartridge unit 3 comprises two substantially identical cheek plates 16 and 17, cam ring 18, rotor 19, and annular disc valves 21 and 22 and their respective biasing springs 23 and 24. The unit is clamped together by bolts 25 and 26, as shown. The rotor 19 contains internal splines adapted for engagement with the splines 8 on shaft 7, and is provided with a plurality of radial slots which slidably receive vanes 27. The inner end of these slots is enlarged as shown to provide vane biasing chambers 28.

Figure 2:
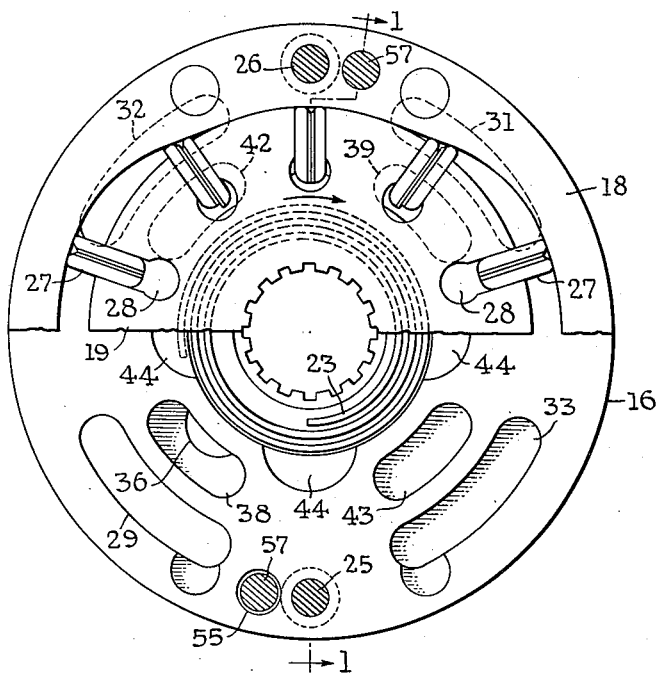
Fig. 2 is a section taken substantially on line 2—2 of Fig. 1 with the cam ring and rotor partially broken away to show the porting arrangement on the inner face of the cheek plate, the housing being omitted for ease of illustration.
Figure 3:
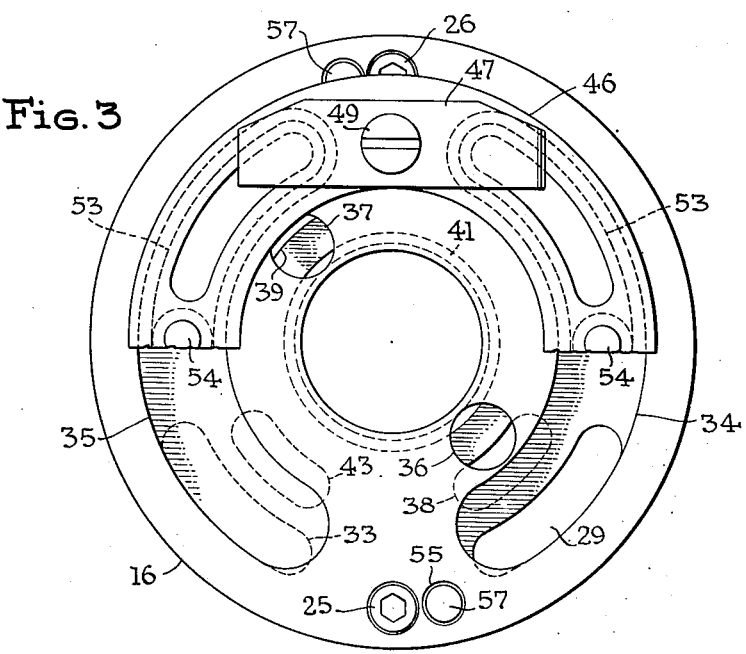
Fig. 3 is a view of the outer face of the cheek plate of Fig. 2 with the asymmetric flow valve partially broken away to show the porting arrangement on this face of the cheek plate.

As shown in Figs. 2, 3 and 6, the inner face of cheek plate 16 is provided with working chamber inlet ports 29 and 31, which extend through the plate, and blind working chamber balancing ports 32 and 33. The outer surface of plate 16 contains kidney shaped recesses 34 and 35, which communicate with inlet ports 29 and 31, and through bores 36 and 37, which intersect vane biasing ports 38 and 39 and annular recess 41 formed on the inner face of the cheek plate. The inner face of the cheek plate also contains blind ports 42 and 43 and four shallow counterbores 44. As can be seen in Fig. 2, when the rotor 19 revolves the chambers 28 at the bases of the vane slots sweep across the ports 38, 39, 42 and 43 and counterbores 44, for the purpose hereinafter described. Inasmuch as cheek plates 16 and 17 are identical except for the location of the bores which receive the piston actuators hereinafter described, their porting arrangements, in the assembled condition, are reversed, i. e., in the assembled position the ports in cheek plate 17 directly facing through ports 29, 31, 38 and 39 in cheek plate 16, are blind, whereas the ports facing blind ports 32, 33, 42 and 43 of cheek plate 16, extend through the plate 17. This arrangement is necessary in order to prevent direct communication between the inlet and exhaust manifolds through the working chambers between the vanes. For convenience of description, the ports and passages in cheek plate 17 will be referred to by the same numerals, with a prime designation, as their adjacent counterparts in plate 16.

An asymmetric flow valve 45 is mounted on the outer face of each cheek plate. Referring to Figs. 3 through 7, this valve comprises an annular disc valve 46, which covers recesses 34 and 35 formed in the outer face of the cheek plate, and which is resiliently attached to the cheek plate by channel shaped springs 47 and 48, machine screws 49 and spacers 51. The disc contains four circumferentially extending slots 52 which communicate with the recesses 34 and 35 formed in the cheek plate. Two leaf spring flapper valves 53 are mounted on the inner face of the disc by attaching means 54 and are arranged so that each of the valves overlies two of the four slots 52. It is thus seen that the valves 53 permit restricted flow in an inward direction and prevent entirely all flow in an outward direction, whereas the disc valve 46 operates in exactly the opposite manner.

The cartridge unit 3 is provided with through bores 55 and 56 which communicate with the manifolds 5 and 6, and are partially covered by disc valves 46, as shown in Fig. 1. These bores are adapted to receive pistons 57 which reciprocate therein for the purpose hereinafter described.

*Operation of the engine*

For purpose of description it will be assumed that the engine is to be operated as a motor and that manifold 5 is the inlet and 6 is the exhaust. Under these conditions fluid will flow from manifold 5 to the working chambers between vanes 27 via leaf spring flapper valves 53, recesses 34 and 35, and working chamber inlet ports 29 and 31. Since the valves 53 act as flow restrictors, the pressure in the working chambers will necessarily be less than the pressure in manifold 5. Under the influence of this pressure fluid, the rotor, as shown in Fig. 2, will commence to rotate in a clockwise direction and the motive fluid will be exhausted through ports 32' and 33' in cheek plate 17. As stated previously these ports in plate 17 extend completely through the plate and thus they communicate with exhaust manifold 6 via the kidney shaped recesses formed in the outer face of cheek plate 17. Since the end faces of pistons 57 are subject to the pressures in the two manifolds, the pistons will move in the direction of the lower pressure. Therefore, in Fig. 1, the pistons will shift to the right into contact with disc valve 46, unseating same against the bias of springs 47 and 48, and thereby permitting unrestricted flow from exhaust ports 32' and 33' to the exhaust manifold 6.

As seen in Fig. 2, the vanes 27 adjacent the inlet ports are allowed to move radially outward. In order to aid this movement, the chambers 28 beneath these vanes are connected to the inlet pressure in manifold 5 via biasing ports 38 and 39 and bores 36 and 37 in cheek plate 16.

When the vanes reach the exhaust ports, the surface of the cam ring forces them radially inward and to prevent undue wear of the cam ring the chambers 28 are exhausted to manifold 6 by way of vane exhaust ports 42' and 43' and bores 36' and 37' in cheek plate 17. Between these transition regions the vanes are in a radially stable position and a smaller biasing force may be used to maintain a proper seal between the vanes and the cam ring than in the transition zone adjacent the inlet port. Accordingly, the pressure of the biasing fluid applied to chamber 28 by way of counterbores 44, annular recess 41, and bores 36 and 37, is reduced by annular disc valve 21 interposed between recess 41 and the counterbores 44. This sequencing of the vane biasing pressures is known in the prior art as evidenced by Rosaen Patent 2,738,774, issued March 20, 1956.

If the engine, while operating as a motor, is overrun by its driven load, it will tend to act as a pump and due to the normal flow restrictions present in the external return circuit the pressure in manifold 6 will increase. When this pressure exceeds that in inlet manifold 5, the pistons 57 will shift to the left in Fig. 1, contacting and unseating the disc valve 46 mounted on cheek plate 16. As a result, the inlet flow to the working chambers will no longer be restricted and the free supply of fluid, which is thus made available, will prevent the occurrence of cavitation. Further, when the pistons 57 shift to the left the disc valve 46 on cheek plate 17 is allowed to seat, thereby restricting the exhaust path from the motor and creating a drag which tends to reduce the overrun condition.

It will be obvious that the direction of rotation of shaft 7 can be reversed by making manifold 6 the inlet and 5 the exhaust. This characteristic is fully described in Rosaen Patent 2,738,774, previously mentioned.

It is also apparent that this engine can operate as a pump without the necessity of pressurizing the inlet manifold. In this case the operation of the engine is substantially the same as when it is used as a motor when the overrunning load condition is encountered. In both instances the pistons 57 will shift in the direction of the inlet to remove the restriction therein and prevent the occurrence of cavitation. As in the case of the motor, the pump would also be reversible.

It is to be understood that this description relates only to a preferred form of the invention and that many changes could be made in the structure shown without departing from the inventive concept. The invention is not limited to the illustrated embodiment except as such limitation is expressed in the appended claims.

What is claimed is:

1. In combination with a rotary engine of the vane type having fluid pressure biased vanes, valve means for creating a differential pressure radially along the vanes; and an actuator for operating said valve means in response to the difference between engine inlet and exhaust pressure.

2. In combination with a rotary engine of the vane type having fluid pressure biased vanes and valve means for creating a pressure differential radially along the vanes, an actuator for varying the effectiveness of said valve means in response to the difference between engine inlet and exhaust pressure.

3. In a rotary engine of the vane type having a working chamber and valve means normally restricting the inlet and exhaust passages of said chamber, the improvement which comprises operating means for selectively rendering ineffective said inlet or exhaust valve respectively depending on whether the exhaust pressure exceeds the inlet pressure or the inlet pressure exceeds the exhaust pressure.

4. In a rotary engine of the vane type having fluid pressure biased vanes and means normally restricting the inlet flow to and exhaust flow from the working chambers, motor means operable in response to the pressure differential across the engine for rendering ineffective the inlet restriction or the exhaust restriction respectively depending on whether exhaust pressure exceeds inlet pressure or inlet pressure exceeds exhaust pressure.

5. In a reversible rotary engine of the vane type having inlet and exhaust manifolds and a plurality of working chambers, an annular valve seat disposed between each manifold and the working chamber; an annular valve disc arranged to cooperate with each seat to prevent flow into the working chambers and restrict flow from the working chambers; spring means biasing each disc toward its seat; a plurality of flow passages formed through each disc; a plurality of leaf springs flexibly mounted on the valve seat side of each disc in overlying closing relation to said flow passages and arranged to prevent flow from the working chambers through the passages and restrict flow in the opposite direction; a plurality of open-ended cylinders communicating between the inlet and exhaust manifolds and located so that the ends of each cylinder are partially covered by a portion of each disc; and a piston disposed in each cylinder and arranged to reciprocate therein to contact and displace whichever disc is on the low pressure side of the engine.

References Cited in the file of this patent

UNITED STATES PATENTS 2,738,774   Rosaen _____ Mar. 20, 1956